United States Patent
Genise et al.

(10) Patent No.: US 10,132,394 B2
(45) Date of Patent: Nov. 20, 2018

(54) DIFFERENTIAL ASSEMBLY

(71) Applicant: EATON INTELLIGENT POWER LIMITED, Dublin (IE)

(72) Inventors: Thomas Alan Genise, Dearborn, MI (US); Gregory L. Heatwole, Marshall, MI (US); Richard Kukucka, Ann Arbor, MI (US); Gabriela Florentina Radulescu, Marshall, MI (US); Daniel Stanley Frazier, Kalamazoo, MI (US); Robert Joseph Kyle, Battle Creek, MI (US); Andrew P. Harman, Battle Creek, MI (US); Robert Michael Arnsparger, Battle Creek, MI (US); Patrick John McMillan, Battle Creek, MI (US); Jamie Gerad Cullen, Ypsilanti, MI (US)

(73) Assignee: Eaton Intelligent Power Limited (IE)

( * ) Notice: Subject to any disclaimer, the term of this patent is extended or adjusted under 35 U.S.C. 154(b) by 775 days.

(21) Appl. No.: 14/598,458

(22) Filed: Jan. 16, 2015

(65) Prior Publication Data

US 2015/0126320 A1    May 7, 2015

Related U.S. Application Data

(63) Continuation of application No. PCT/US2013/050309, filed on Jul. 12, 2013.
(Continued)

(51) Int. Cl.
*F16H 48/08* (2006.01)
*F16H 37/04* (2006.01)
(Continued)

(52) U.S. Cl.
CPC .......... *F16H 37/046* (2013.01); *B60K 17/08* (2013.01); *B60K 17/16* (2013.01); *F16H 48/08* (2013.01);
(Continued)

(58) Field of Classification Search
CPC .. F16H 2048/368; F16H 48/08; F16H 37/046; F16H 37/08; F16H 37/0806;
(Continued)

(56) References Cited

U.S. PATENT DOCUMENTS 2,516,850 A * 8/1950 Brownyer ............... F16D 23/02
475/204
3,371,556 A * 3/1968 Duchesne ................. F16H 3/50
475/308

(Continued)

FOREIGN PATENT DOCUMENTS

WO    WO 02/09966 A1    2/2002
WO    WO 2013/036521 A1    3/2013

OTHER PUBLICATIONS

International Search Report for corresponding International Patent Application No. PCT/US2013/050309 dated Oct. 16, 2013.

*Primary Examiner* — Erin D Bishop
(74) *Attorney, Agent, or Firm* — Merchant & Gould P.C.

(57) ABSTRACT

A differential assembly with at least a first gear ratio and a second gear ratio that can be integrated with an automatic transmission system thereby increasing the total number of available gear ratios is presented. A method of shifting to improve engine efficiency is also provided.

17 Claims, 8 Drawing Sheets

Related U.S. Application Data

(60) Provisional application No. 61/672,127, filed on Jul. 16, 2012.

(51) Int. Cl.
  B60K 17/08 (2006.01)
  B60K 17/16 (2006.01)
  F16H 61/70 (2006.01)
  *F16H 48/36* (2012.01)
  *B60K 17/34* (2006.01)
  *F16H 61/02* (2006.01)

(52) U.S. Cl.
  CPC ............ *F16H 61/702* (2013.01); *B60K 17/34* (2013.01); *F16H 61/0213* (2013.01); *F16H 2048/368* (2013.01); *F16H 2061/0223* (2013.01); *F16H 2061/0225* (2013.01); *F16H 2061/0234* (2013.01)

(58) Field of Classification Search
  CPC ............... F16H 37/0813; F16H 37/082; F16H 2200/0034; F16H 2200/2005; F16H 2200/2035; B60K 17/16; B60K 17/08; B60K 17/348; B60K 17/35; B60K 17/3505
  See application file for complete search history.

(56) References Cited

U.S. PATENT DOCUMENTS

| | | |
|---|---|---|
| 5,503,603 A | 4/1996 | Adam et al. |
| 5,651,748 A | 7/1997 | Adam et al. |
| 7,699,743 B2 | 4/2010 | Diosi et al. |
| 7,789,792 B2 | 9/2010 | Kamm et al. |
| 8,016,712 B2 | 9/2011 | Phillips et al. |
| 8,047,951 B2 | 11/2011 | Wittkopp et al. |
| 8,092,334 B2 | 1/2012 | Peura et al. |
| 2009/0264242 A1 | 10/2009 | Carey et al. |
| 2010/0317480 A1* | 12/2010 | Cochren ............... F16H 48/29 475/220 |

* cited by examiner

FIG. 6

| VW Passat 6-DCT | | | With 2-Speed | | |
|---|---|---|---|---|---|
| | Primary | Overall Stock | Primary | Overall Low | Overall High |
| 1st Gear | 4.04 | 15.6348 | 5.0 launch | 22.5 | 15 |
| 2nd Gear | 2.37 | 9.1719 | 3.8 | 17.1 | 11.4 |
| 3rd Gear | 1.56 | 6.0372 | 3 | 13.5 | 9 |
| 4th Gear | 1.16 | 4.4892 | 2.2 | 9.9 | 6.6 |
| 5th Gear | 0.85 | 3.2895 | 1 | 4.5 | 3 |
| 6th Gear | 0.67 | 2.5929 | 0.5 | 2.25 | 1.5 |
| Final Drive | | 3.87 | | 4.53.00 | |

DIFFERENTIAL ASSEMBLY

This application is a Continuation of PCT/US2013/050309 filed on 12 Jul. 2013, which claims benefit of U.S. Patent Application Ser. No. 61/672,127 filed on 16 Jul. 2012, and which applications are incorporated herein by reference. A claim of priority is made to each of the above disclosed applications.

TECHNICAL FIELD

The present disclosure provides a differential assembly that increases the number of available gear ratios and overall ratio spread between the output shaft of a motor and the axle shafts of the vehicle.

BACKGROUND

The drive train of a motor vehicle is configured to transfer power from the vehicle's motor to the vehicle's wheels. The drive train typically includes a transmission that includes a gearing assembly that provides the vehicle with a set number of available speeds (also referred to as gear ratios). For example, a six speed automatic transmission has first gear, second gear, third gear, fourth gear, fifth gear, sixth gear, and reverse. The ratio between the rotational speed of the drive shaft (output shaft of the motor) and the output shaft of the transmission is different for each gear/speed.

For example, the gear ratio for 1st gear could be three to one (3:1) and the ratio for sixth gear could be one-half to one (0.5:1). For the transmission in the above example, when the vehicle is in first gear the output shaft of the engine (i.e., input shaft of the transmission) rotates three times for each rotation of the output shaft of the transmission. This ratio ("low" gear) is used when the vehicle is starting from a stop and for relatively slow speeds. On the other hand, when the transmission in the above example is in sixth gear, the output shaft of the engine rotates one-half of a revolution for each rotation of the output shaft of the transmission. This ratio ("high" gear) is used when the vehicle is traveling at high speeds. The drive train can also include differentials which transfer torque from the transmission to the axles coupled to the wheels of the vehicle.

The ratio between the number of rotations of the engine and the number of rotations of the axle shaft (wheel rotations) is referred to as the overall gear ratio. This ratio is the product of the transmission ratios described above as well as the final drive ratio which is defined by the gearing in the differentials (e.g., number of teeth on the final drive pinion gear and the final drive ring gear). For example, if the final drive ratio is three to one (3:1), the overall ratio for first gear in accordance with the example above would be nine to one (9:1) which is the product of three (first gear ratio) times three (the final drive ratio). This ratio would be the launch ratio since it is used to launch the vehicle from a standstill.

To maximize the performance of the engine at full-throttle (e.g., horse power, torque, fuel efficiency) it is desirable to operate the engine in its particular target speed range (e.g., the engine speed (rotations per minute (RPM)) generally associated with the RPM near and between the peak torque to peak horsepower commonly known as the "power band"). Automatic transmissions are configured to automatically shift the transmission to keep the engine speed in this power band target range during full-throttle operation. However, when at "part-throttle" or "light-throttle" conditions that often exist when the vehicle is cruising, or accelerating at a less-than-maximum rate, or otherwise in a condition that requires less-than-full-throttle, the desired target engine speed is likely lower than that of full-throttle to maximize fuel efficiency and driver comfort. The shift timing and sequence is based on a number of factors including the speed of the vehicle and performance desired (e.g., maximum acceleration, maximum fuel efficiency, etc.), and is usually controlled by one or more system inputs (e.g., throttle position, engine and vehicle speed, oil temperature, etc). For example, to maximize fuel efficiency while cruising at a fairly constant speed, it is generally desirable to maintain the engine speed at a relatively low speed that is still high enough to have sufficient power to maintain the desired driving speed.

All other factors being equal, transmissions with more available gear ratios and wider overall ratio spreads enable the vehicle to be run more effectively since it is more likely that the optimum target engine speed can be maintained. For example, a particular engine when paired with a nine speed transmission will typically be more fuel efficient than the same engine paired with a four speed transmission. A vehicle with more available speeds can also be smoother riding since the engine speed can be kept closer to constant while the wheel speed varies, resulting in a relatively consistent feel. Practical design constraints (e.g., limits on the space available for additional gearing, undesirability of adding weight to the assemblies, undesirability of adding complexity in shift controls, energy loss due to additional friction in the drive train, etc.) limit the number of speeds of commercially available transmissions. There is a need in the art to provide vehicles with more gear ratios while addressing these and other design constraints.

SUMMARY

The present disclosure provides a differential assembly with at least a first gear ratio and a second gear ratio. The differential assembly of the present disclosure can be integrated with an automatic transmission system, thereby increasing the number of available gear ratios. A method of shifting to improve engine efficiency is also disclosed.

BRIEF DESCRIPTION OF THE DRAWINGS

FIG. 6 is a chart comparing the gear ratio and shift sequence for a standard vehicle to a vehicle equipped with an embodiment of the present disclosure;

DETAILED DESCRIPTION

The present disclosure will be described herein integrated into a front wheel drive or all-wheel drive vehicle with an automatic transmission. It should be appreciated that the teachings of the present disclosure can be utilized in a variety of different types of motor vehicles having different drive train configurations, transmission configurations, and engine configurations.

Figure 1:
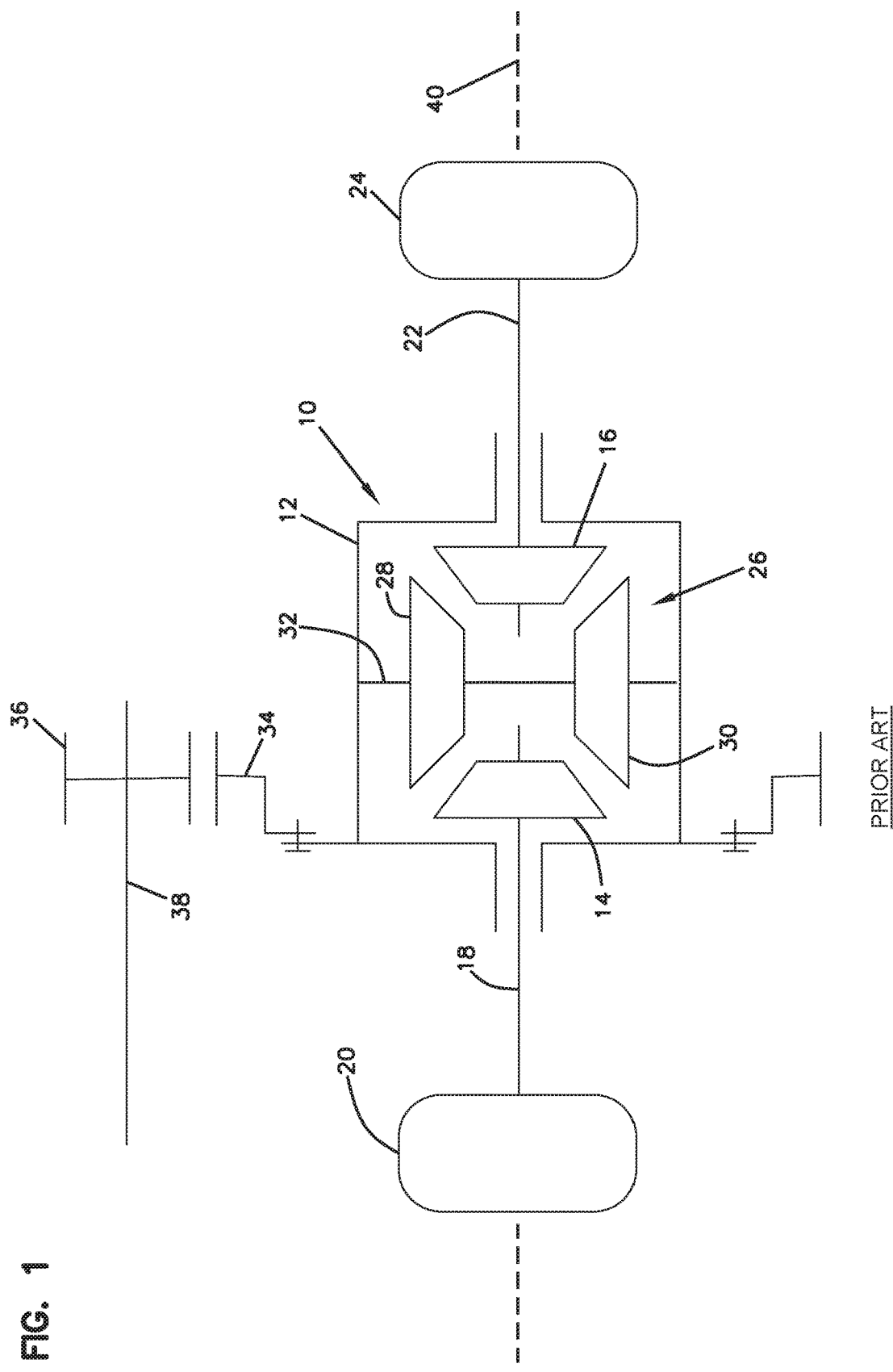
FIG. 1 is a schematic of a prior art one speed differential configuration.

FIG. 1 is a high level schematic illustration of a differential 10. The differential 10 includes a case 12 also referred to herein as a differential housing. A pair of opposed side gears 14, 16 are located within the case 12. The side gears 14, 16 are connected to half axle shafts 18, 22 that drive the rotation of wheels 20, 24. A torque transfer arrangement 26 is provided between the differential housing and the first and second side gears 14, 16. The torque transfer arrangement 26 is configured to transfer torque while concurrently permitting differential rotation of the first and second side gears 14, 16 about a rotation axis 40 of the axle shafts 18, 22. In other words, the torque transfer arrangement 26 is configured to allow the wheels 20, 24 to rotate at different speeds when necessary (e.g., cornering).

In the depicted embodiment, the torque transfer arrangement 26 includes a pair of pinion gears 28, 30 that are connected by a pinion shaft 32 that rotates with the case 12. The rotation of the case 12 rotates the cross shaft 32 about axis 40. As the pinion shaft 32 rotates, the pinion gears drive the side gears 14, 16, which rotate the axles 18, 24 thereby causing the wheels 20, 24 to rotate. It should be appreciated that many other embodiments of torque transfer arrangements are possible.

Still referring to FIG. 1, a final drive ring gear 34 is schematically shown connected to the outside of the case 12 to drive the rotation of the case about axis 40. The final drive ring gear 34 is driven by a final drive pinion gear 36, which is driven by a transmission output shaft 38. The ratio between the number of rotations of the transmission shaft 38 that cause one full rotation of the axle 18, 24 is known as the final drive ratio. The final drive ratio is dependent on the configuration of the final drive pinion gear 36 and the final drive ring gear 34 (e.g., the ratio between the number of teeth on the final drive pinion gear and the final drive ring gear). As is typical in a front wheel drive vehicle with a transaxle arrangement, the transmission output shaft 38 is parallel to the front axles 18, 22.

Figure 2:
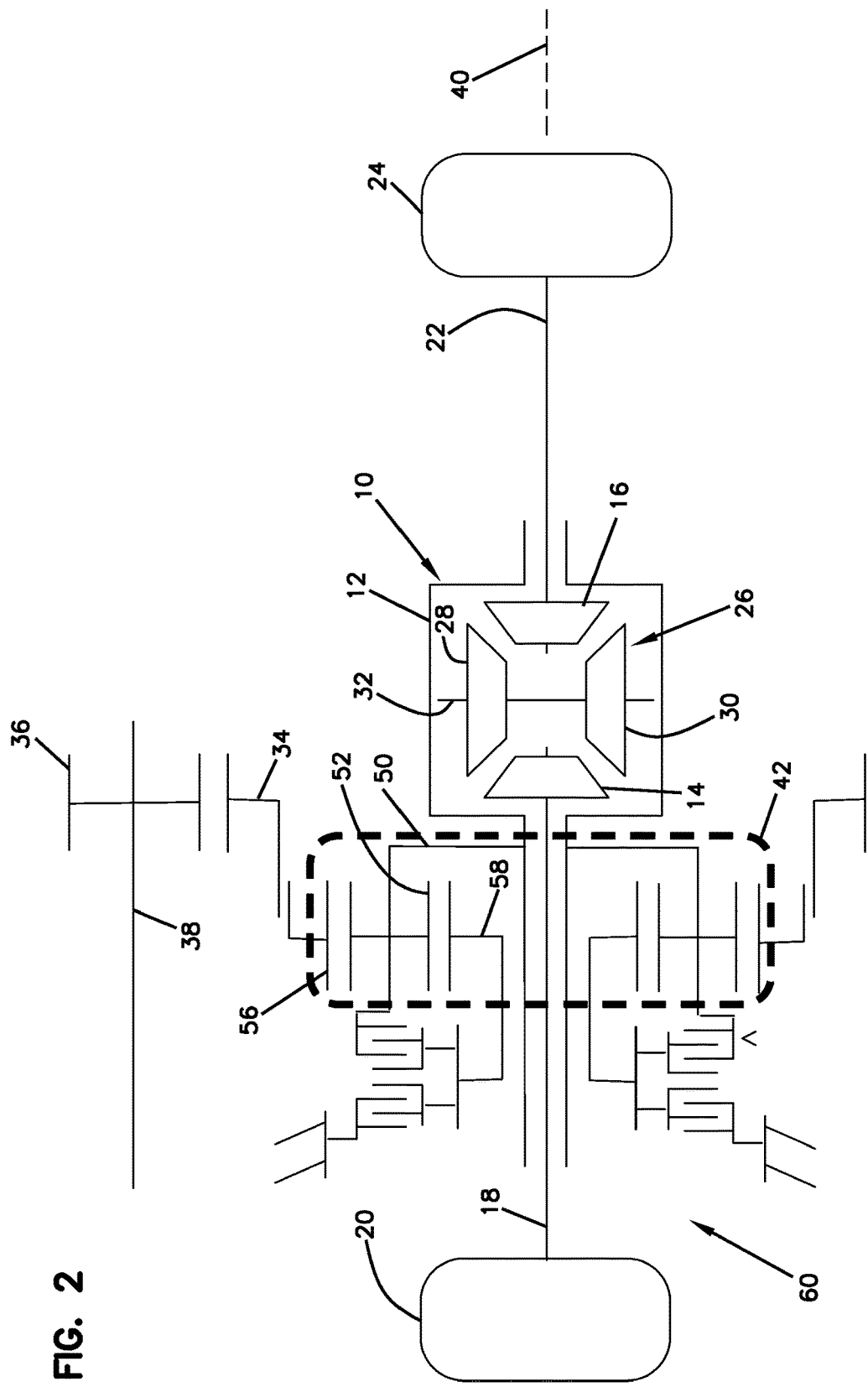
FIG. 2 is a schematic of an embodiment of a multispeed differential of the present disclosure.

FIG. 2 is a schematic of an embodiment of the present disclosure integrated into the transaxle configuration described above with reference to FIG. 1. The like features will be referenced with the same reference numbers. In the depicted embodiment a multispeed gear assembly 42 is positioned operably between the final drive ring gear 34 and the case 12 of the differential 10. In the depicted embodiment the multispeed gear assembly 42 is a two speed gear set in that the gear assembly 42 includes a first state corresponding to a first gear ratio and a second state corresponding to a second gear ratio, which is different than the first gear ratio (the first and second states are also referred to herein as a first gear mode and a second gear mode). The first and second gear ratios are also characterized herein as first and second different final drive ratios. It should be appreciated that in alternative embodiments the multispeed gear assembly can be arranged differently and can also have more than two gear modes.

In the depicted embodiment the multispeed gear assembly 42 includes: a planetary carrier 50 that rotates about the rotation axis 40 together with the case 12 (differential housing); a number of planetary gears 52 (a planetary gear set) that are rotatably connected to the planetary carrier 50; a planetary ring gear 56 that intermeshes with the planetary gears 52 (planetary gear set); and, a sun gear 58 that intermeshes with the planetary gears 52 (planetary gear set) and is axially aligned along the rotation axis 40. It should be appreciated that in alternative embodiments the multispeed gear assembly can have a different configuration including, for example, configurations that do not include a sun gear and planetary gears.

The multispeed gear assembly 42 of the depicted embodiment further includes a shifting assembly 60 (e.g., a clutch assembly) for selectively forcing either the planetary carrier 50 to rotate relative to the sun gear 58, or the planetary carrier 50 to be fixed relative to the sun gear 58. The final drive ratios are different in these two different conditions.

In the depicted embodiment the shifting assembly 60 is configured so that the final drive ratios can be changed without completely cutting torque to the multispeed gear assembly 42 such as by shifting the transmission into a neutral position in an automatic transmission or depressing a manual clutch to disengage the engine in a manual transmission. In other words, the shifting assembly 60 can be a power-shift type shifting assembly. In other alternative embodiments the shifting assembly can require cutting torque to the multispeed gear assembly in order to shift the ratio from one to the other.

In the depicted embodiment the shifting assembly 60 is configured to have a first gear mode and a second gear mode. In the first gear mode the sun gear 58 is prevented from rotating about the rotation axis 40 such that torque from the outer ring gear 56 drives the planetary gears 52, which causes the planetary carrier 50 and the differential housing 12 to rotate relative to the sun gear 58. In other words, in the first gear mode the sun gear 58 is tied to ground preventing its rotation via the shift assembly 60 such that planetary gear 52 revolve about the sun gear 58 when driven by the ring gear 34. As the planetary gears 52 revolve about the sun gear 58, the planet carrier 50 and the differential housing 12 are rotated about the axis 40. It should be appreciated that any system that is configured to control relative rotation between two components can be used to cause the multispeed gear assembly to shift from the first gear mode to the second gear mode (e.g., tension bands, clutch packs, etc.). In the depicted embodiment, this first gear mode corresponds to a "low gear" ratio. In the first gear mode the reduction of the final drive ratio is the product of the reduction resulting from the multispeed gear assembly 42 combined with the reduction resulting from the final drive pinion gear 36 and final drive ring gear 34. For example, the reduction from the multispeed gear assembly can be one and a half to one (1.5:1) and the reduction of the pinion gear 36 and final drive ring gear 34 can be three to one (3:1) resulting in the total final drive reduction of four and a half to one (4.5:1).

In the second gear mode the sun gear 58 is de-coupled from ground and relative rotation is prevented between the sun gear 58 and the planetary carrier 50 such that torque from the planetary ring gear 56 causes the planetary gears 52, the planetary carrier 50 and the differential housing 12 to rotate together as a unit about the rotation axis 40. In other words, in the second gear mode the sun gear 58 is rotated with the planetary carrier 50 (e.g., the sun gear 58 can be clutched to the planetary carrier 50) and de-coupled from ground by the shifting assembly 60. In the depicted embodiment, this second gear mode corresponds to a "high gear" ratio (e.g., a final drive ratio of three to one (3:1) wherein the reduction is the sole result of the relationship between the final drive pinion gear 36 and final drive ring gear 34). In other words the multispeed gear assembly on the second gear mode results in a one to one (1:1) ratio (no reduction).

Figure 3:
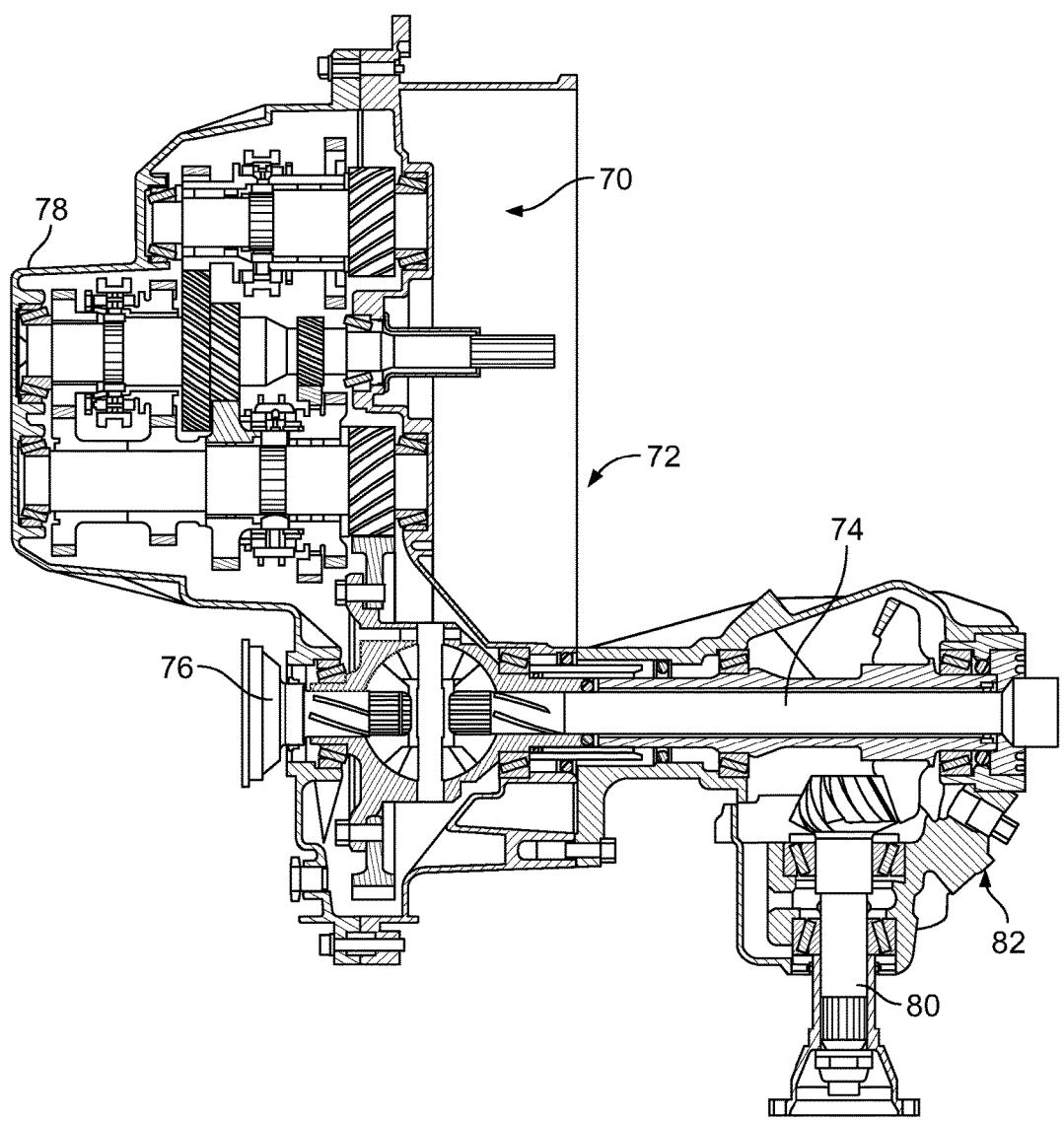
FIG. 3 is a cross-section of a drive train in accordance with the present disclosure of an all-wheel drive vehicle.

Referring to FIG. 3 a cross-section of a portion of a drive train of an all-wheel drive vehicle is shown. In the depicted configuration the transmission 70, front differential 72, and part of the front axles 74, 76 are integrated within the same case 78 or housing. In this transaxle configuration the engine of the vehicle is transversely mounted. In the depicted embodiment the rear wheels of the vehicle (not shown) receive torque via a rearward extending shaft 80, which results in all-wheel drive. In the depicted embodiment the multispeed gear assembly 42 described above is located in the case of a transaxle between transmission components and the differential components. The multispeed gear assembly could alternatively be located between the front axle 74 and the rearward extending shaft 80 in area 82.

Figure 4:
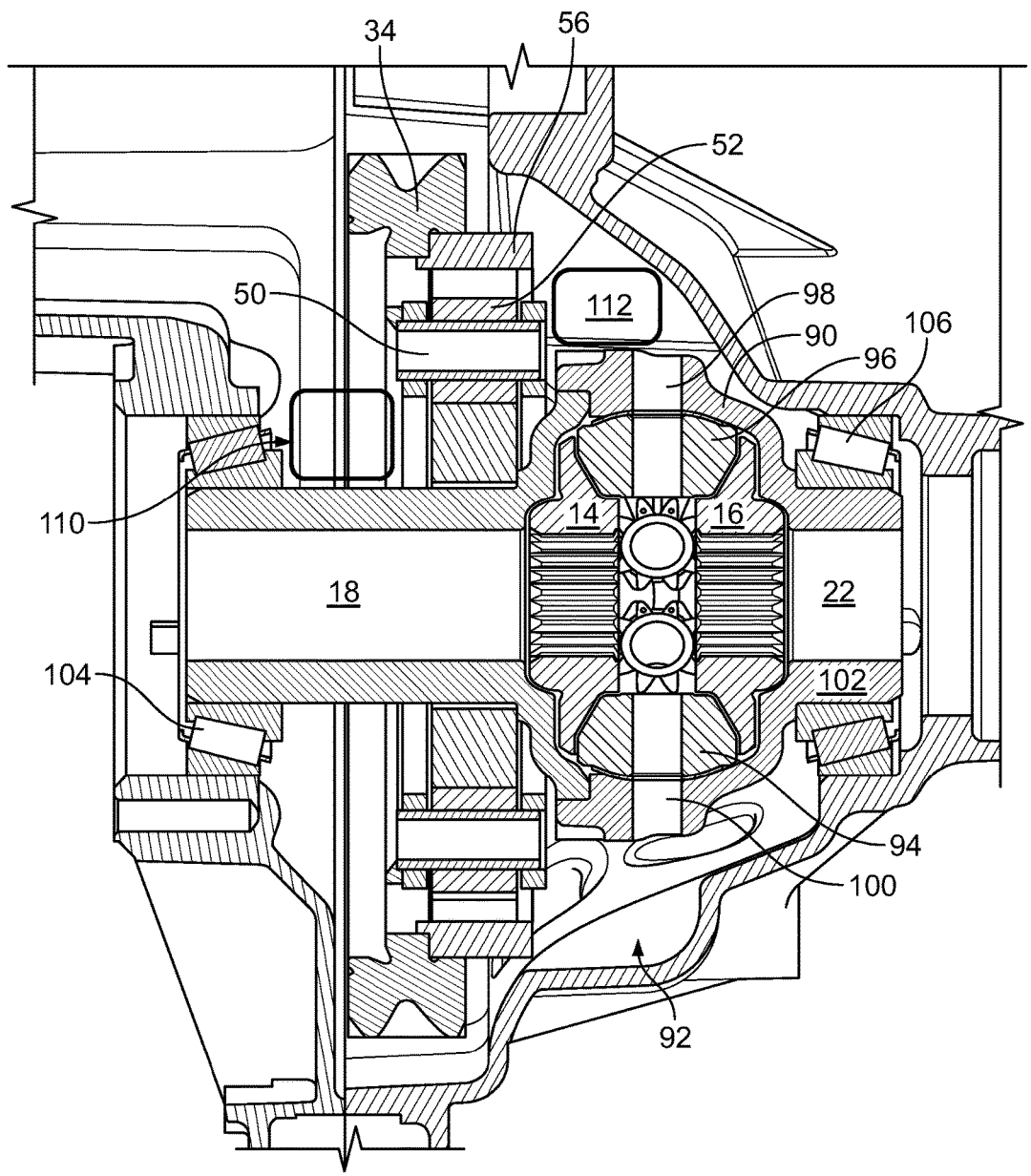
FIG. 4 is a partial enlarged cross-sectional view of a planetary gear set and differential of the drive train of FIG. 3.

Referring to FIG. 4 a partial cross-sectional view of an embodiment of the present disclosure integrated into a transaxle is shown. In the disclosed embodiment the differential 90 has a particular compact construction. The differential 90 includes side gears 14, 16 splined to axle shafts 18 and 22. The differential includes a torque transfer arrangement 92 that includes pinion gears 94, 96 supported on pinion shafts 98, 100 that extend into and rotate with the case 102 which is rotatably supported in the transaxle case 78 via bearings 104, 106. Further description of the compact differential construction can be found in PTC Application No. WO 2013/036521, which is herein incorporated by reference in its entirety.

FIG. 4 depicts structurally a number of the same features that are functionally described above with reference to FIGS. 2 and 3. FIG. 4 depicts an embodiment of the final drive ring gear 34, the planetary ring gear 56, the planetary gears 52, and the planetary carrier 50. A shifting assembly including clutches/brakes can be located in spaces 110 and 112, which is available due to the particularly compact construction of the differential and gearing configuration of the multispeed gear assembly 42.

Figure 5:
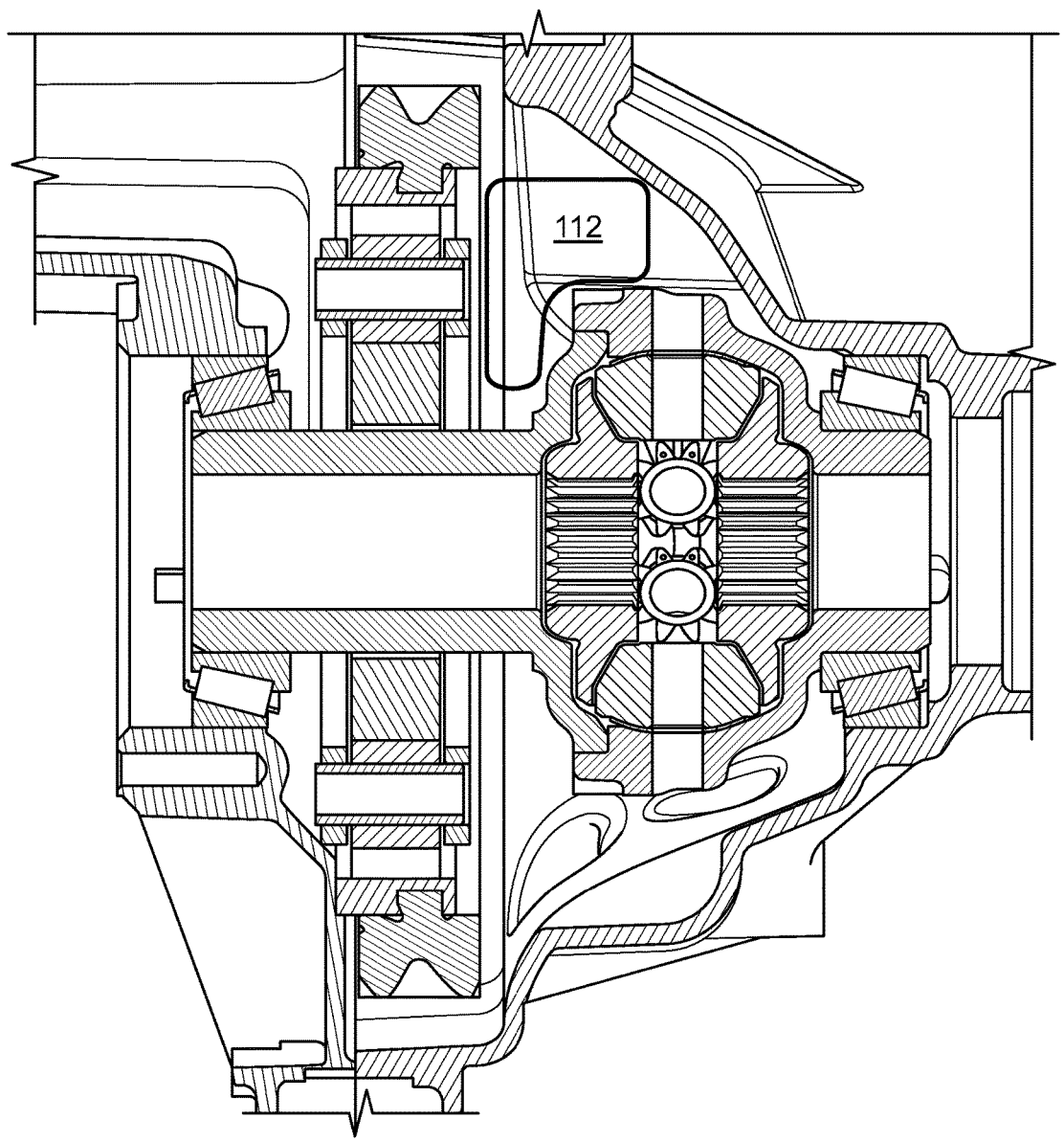
FIG. 5 is a partial enlarged cross-sectional view of an alternative construction planetary gear set and differential of the drive train of FIG. 3.

Referring to FIG. 5 an alternative embodiment of the configuration disclosed in FIG. 4 is shown. Many of the components shown in FIG. 5 are identical to those shown in FIG. 4, and will therefore not be discussed further with reference to FIG. 5. In FIG. 5 the gearing of the multispeed gear assembly 42 is shifted further away from the differential 90 thereby creating relatively less space to the left of the gear set (planetary gears, sun gear, and planetary carrier) and relatively more space to the right of the gear set. In the depicted embodiment the shifting assembly (e.g., clutch packs, tension bands, etc.) can be located in spaces 110 and 112, which are made available due to the compact construction of the differential and gearing configuration of the multispeed gear assembly 42.

Referring to FIG. 6 a chart comparing the gear ratio for a standard vehicle to a vehicle equipped with an embodiment of the present disclosure is shown. In the depicted embodiment the baseline used for comparison is a six speed sedan (e.g., Volkswagen Passat). The gear ratios that correspond to first through sixth gears are provided. Two ratios, the "primary" ratio and the "overall" ratio, are provided for each gear/speed. The first ratio, referred to as the "primary" ratio represents the ratio between input shaft to the transmission (output shaft of the engine) and the output shaft of the transmission. For example the "primary" for first gear is 4.04 to 1 and the "primary" for sixth gear is 0.67 to 1. The second ratio, referred to as the "overall" ratio, represents the ratio between input shaft to the transmission (output shaft of the engine) and the axles that drive the rotation of the wheels. The difference between the two ratios is due to the final drive ratio resulting from the gearing associated with the differential (e.g., final drive pinion gear, final drive ring gear). For example the "overall" for first gear is 15.63 to 1 and the "overall" for sixth gear is 2.59 to 1. Since the ratios are progressive, the shifting sequence is generally sequential from first gear up to sixth gear and back down from sixth gear to first gear.

In contrast, the differential assembly according to the present disclosure has more than a single final drive ratio. For example, in the embodiment shown in FIG. 6 the overall drive ratio in fifth gear can be four and a half to one (4.5:1) or three to one (3.0:1). The four and a half to one (4.5:1) ratio results when the planetary carrier 50 rotates relative to the sun gear 58 (e.g., sun gear 58 is clutched to ground/braked). The three to one (3:1) ratio results when the planetary carrier 50 rotates with the sun gear 58 (e.g., sun gear is clutched to the carrier). When the planetary carrier 50 rotates with the sun gear 58, the reduction of the final drive ratio is the sole result of the final drive pinion gear and final drive ring gear configuration since the gearing particular to the multispeed gearing assembly results in a 1 to 1 ratio and also the transmission does not cause a reduction (i.e., the primary ratio is one to one (1:1)).

Still referring to FIG. 6, a reconfiguration of the gearing of the sedan is shown that employs the principles of the present disclosure. As discussed above, in the depicted embodiment two sets of overall gear ratios are provided that correspond to the first gear mode and the second gear mode. According to the depicted embodiment, when the shifting assembly 60 is in the first gear mode, first gear has an overall ratio of 22.5 to 1 and sixth gear has an overall ratio of 2.25 to 1. When the shifting assembly 60 is in the second gear mode, first gear has an overall ratio of 15.0 to 1 and sixth gear has an overall ratio of 1.5 to 1.

Figure 7:
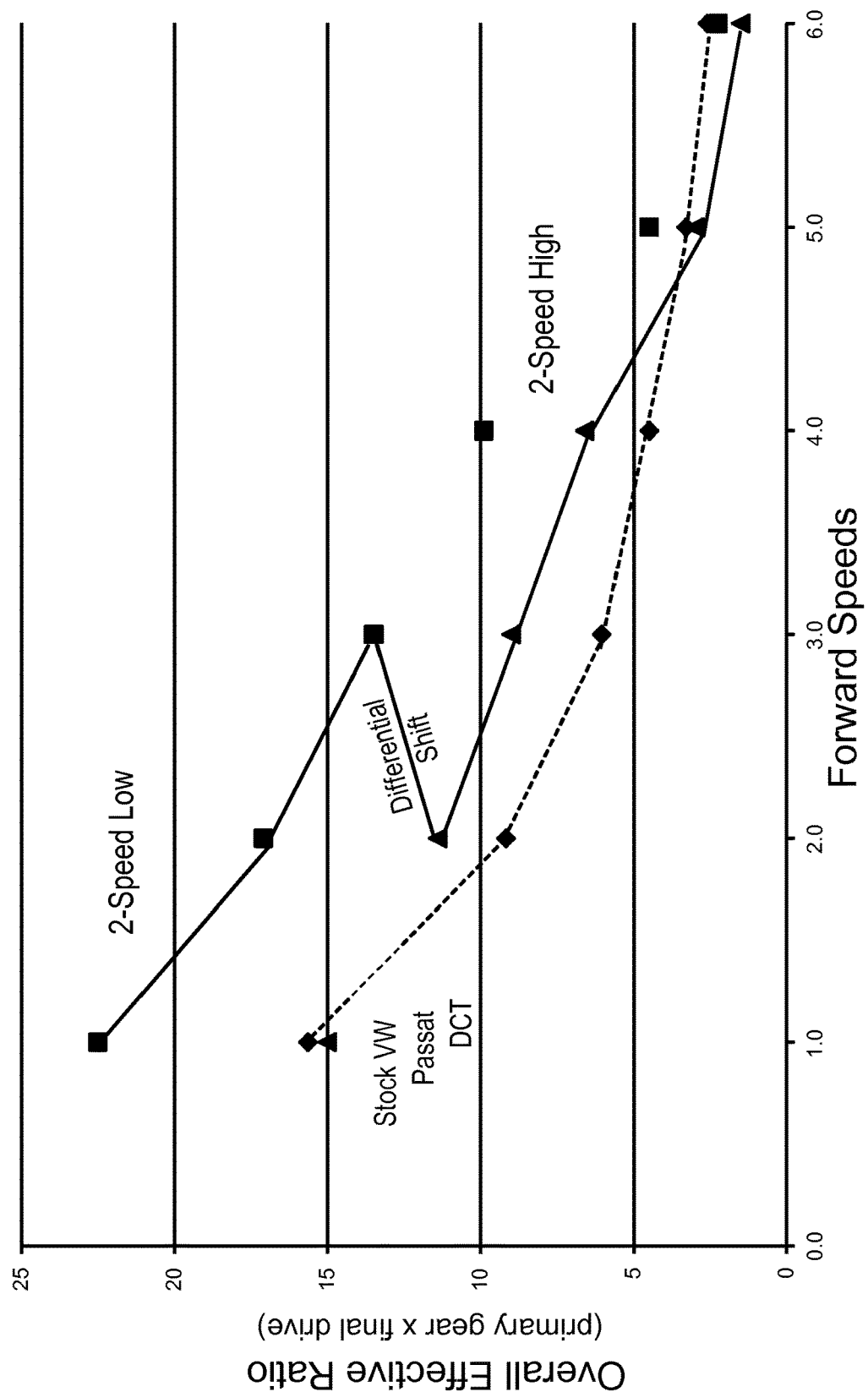
FIG. 7 is a chart illustrating the shifting sequence of a standard six speed vehicle to a vehicle equipped with an embodiment of the present disclosure.

Referring to both FIGS. 6 and 7, according to the example embodiment the first gear mode is utilized for the first three shifts in the transmission from first to third gear resulting in the following ratios: 22.5:1, then 17.1:1, then 13.5:1. Then the multispeed gear assembly shifts to the second gear mode while the main transmission is shifted back to second gear resulting in the following ratios 11.4:1, then 9:1, then 6.6:1, then 3:1, and finally 1.5:1. In the depicted embodiment, there are twelve total available ratios with eight of them utilized. In effect the present disclosure converts a six speed transmission to twelve speed transmission with eight speeds used for ordinary driving. The vehicle equipped with the present disclosure had desirable launch ratio of 22.50 to 1 as compared to the standard six speed launch of 15.63 to 1. This results in improved acceleration from a stop. It also has a desirable high speed (overdrive) ratio of 1.50 to 1 as compared to the lower 2.59 to 1 associated with the standard six speed transmission. This results in improved fuel efficiency (relatively lower engine speeds) at highway speeds.

In some embodiments the up shift from first to top gear passes through different gear ratios than the down shift from top gear back to first gear. For example the up shifts can be as described above through the following ratios: 22.5:1, 17.1:1, 13.5:1, 11.4:1, 9.0:1, 6.6:1, 3.0:1 and 1.5:1. The down shifts can be, for example, through the following ratios: 1.5:1, 3.0:1, 6.6:1, 9.0:1, 11.4:1 and 15.0:1. This down shift can be desirable so as it does not require shifting from the differential configuration from second gear mode to first gear mode until the vehicle comes to a stop. It can be used, for example, when the vehicle slows down to make a turn and then speeds back up while never coming to a stop. In this scenario the low ratios of 17.1:1 and 22.5:1 may not be need or even as desirable as 15.0:1, which is "first gear" with the differential in the second gear mode. When this sequence is applied, the vehicle effectively moves through nine available ratios even though the main transmission has only six speeds. It should be appreciated that many other shift sequences are possible. For example, different shifting sequences can be associated with different driving modes (sport mode, economy mode, off-road mode, rock crawling mode, snow and ice mode, etc.). For example. in a snow and ice mode to avoid wheel slip it may be desirable to launch from a stop in the second gear mode with the 15:1 ratio instead of the 22.5:1 ratio available in the first gear mode or, alternatively, it may be desirable to launch from a stop in the first gear mode from "second gear" resulting in a 17.1:1 ratio. In addition, in alternative embodiments the multispeed gearing assembly can improve performance primarily at the high speed range rather than primarily for improved launch at lower speeds as shown in FIG. 7. In other words, in alternative embodiments the differential between the stock gearing and the gearing according to the present disclosure can be as large or larger at sixth gear as the differential between the stock gearing in first gear and the gearing according to the present disclosure depicted in FIG. 7.

Figure 8:
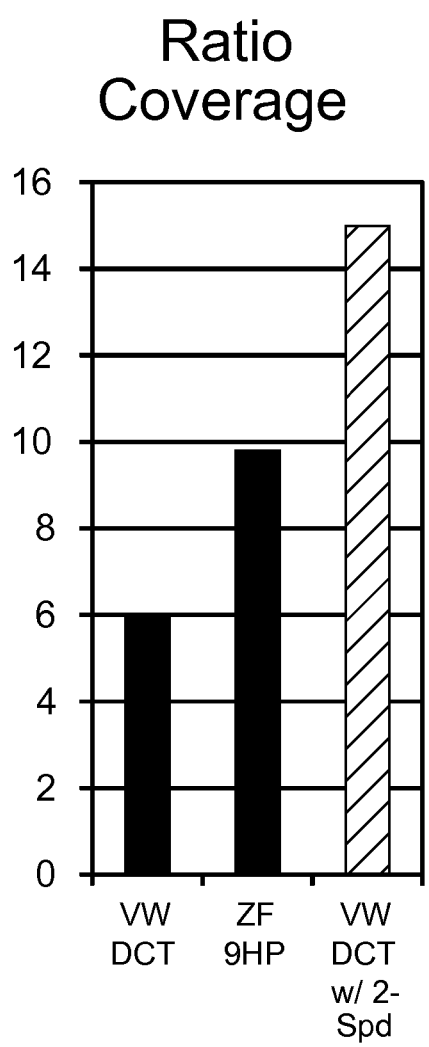
FIG. 8 is a chart comparing the ratio coverage for a standard six speed vehicle, a vehicle equipped with a known nine speed transmission, and a vehicle equipped with an embodiment of the present disclosure.

FIG. 8 illustrates that the present disclosure can result in improved (increased) ratio coverage. In the standard six speed configuration the low ratio is 15.63 and the high ratio is 2.59 so the coverage is about 6 (15.63 divided by 2.59). With a known nine speed transmission the expected coverage is 9.7. As shown in the example, by employing the present disclosure the low ratio is 22.5 and the high ratio is 1.5 so the coverage is about 15 (22.5 divided by 1.5). The increase ratio coverage results in a smoother ride (improved shift quality). It also enables the vehicle to be run more effectively since the target engine speed can be better maintained. For example, in a fuel economy mode the engine speed can be maintained at a low speed even when the vehicle is traveling at a high ground speed, and for sport mode the engine speed can be maintained in the power band (higher RPM) at various ground speeds.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A transaxle comprising:
   a case;
   an automatic transmission within the case;
   a multispeed differential within the case, the multispeed differential including
      a multispeed gear assembly including a planetary gear set having a sun gear, a plurality of planet gears operably connected to a differential housing via a carrier, and a ring gear driven by an output shaft of the automatic transmission, the multispeed differential configured to define a final drive ratio, the final drive ratio selected from at least a first final drive ratio and a second final drive ratio,
      a clutch assembly configured to selectively change the final drive ratio of the multispeed gear assembly between the first final drive ratio and the second final drive ratio even while torque is transmitted via the transmission output shaft, wherein the clutch assembly is operably connected to the sun gear of the multispeed gear assembly, wherein the clutch assembly grounds the sun gear to achieve the first final drive ratio and allows the sun gear to rotate to achieve the second final drive ratio; and
      a control system that is configured to activate the clutch assembly to change the final drive ratio while torque from the transmission output shaft is transmitted to vehicle wheels.

2. The transaxle of claim 1, wherein the automatic transmission is configured to transition in a gear shifting sequence from a first gear ratio to a second gear ratio and then to a third gear ratio and wherein the control system activates the clutch assembly to change the final drive ratio at different points relative to the gear shifting sequence of the automatic transmission.

3. The transaxle of claim 1, wherein the transaxle is part of a vehicle, wherein the automatic transmission is configured to transition in a gear shifting sequence from a first gear ratio to a second gear ratio and then to a third gear ratio and wherein the control system activates the clutch assembly at a different point relative to the gear shifting sequence of the automatic transmission based in part on whether the vehicle is accelerating versus whether the vehicle is decelerating.

4. The transaxle of claim 1, wherein the transaxle is part of a vehicle, wherein the automatic transmission is configured to transition in a gear shifting sequence from a first gear ratio to a second gear ratio and then to a third gear ratio and wherein the control system activates the clutch assembly at a different point relative to the gear shifting sequence of the automatic transmission based in part on whether the vehicle is accelerating from a stop verses accelerating from a state where the vehicle is in motion.

5. The transaxle of claim 1, wherein the transaxle is part of a vehicle, wherein the automatic transmission is configured to transition in a gear shifting sequence from a first gear ratio to a second gear ratio and then to a third gear ratio and wherein the control system activates the clutch assembly at a different point relative to the gear shifting sequence of the automatic transmission based in part on the drive mode selected by an operator of the vehicle.

6. The transaxle of claim 1, wherein the control system is configured to activate the clutch assembly to change to the second final drive ratio of the multispeed differential after the automatic transmission passes through at least one gear ratio of the automatic transmission while the multispeed differential is in the first final drive ratio.

7. The transaxle of claim 6, wherein the control system is configured to activate the clutch assembly to change to the second final drive ratio of the multispeed differential after the automatic transmission passes through at least two gear ratios of the automatic transmission while the multispeed differential is in the first final drive ratio.

8. The transaxle of claim 1, wherein the automatic transmission output shaft drives the rotation of a final drive pinion gear, which drives a final drive ring gear, which drives the multispeed gear assembly.

9. A method of shifting the transaxle of claim 1 comprising:
   automatically selecting between the first final drive ratio and the second final drive ratio depending on predetermined parameters,
   wherein the first final drive ratio is used to launch the vehicle from a stop and the second final drive ratio is used to maximize fuel efficiency during highway driving,
   wherein the selection of the first and second final drive ratios is automatic.

10. The method of claim 9, wherein the predetermined parameters include information regarding a user selected drive mode.

11. The method of claim 9, wherein the predetermined parameters include information regarding a current vehicle speed, a past vehicle speed, and a current engine speed.

12. The method of claim 9, wherein when the multispeed differential is operating with the first final drive ratio, the planetary gears rotate relative to the sun gear, and wherein when the multispeed differential is operating in the second final gear ratio, the sun gear rotates with the planetary gears.

13. The transaxle of claim 1, wherein the clutch assembly locks the sun gear to the carrier to prevent relative rotation between the sun gear and the plurality of planet gears to achieve the second final drive ratio.

14. A transaxle comprising:
   a multispeed differential including a differential housing that rotates about a rotation axis;
   wherein the multispeed differential includes a torque transfer arrangement including first and second side gears that respectively define first and second output shaft openings aligned along the rotation axis, the torque transfer arrangement being configured to transfer torque between the differential housing and the first and second side gears while enabling differential rotation of the first and second side gears about the rotation axis;
   wherein the multispeed differential further includes:
      a planetary carrier that rotates about the rotation axis with the differential housing;
      a planetary gear set rotatably connected to the planetary carrier;
      an outer ring gear that drives the planetary gear set which rotates the planetary carrier and the differential housing about the rotation axis;
      a sun gear that intermeshes with the planetary gear set, the sun gear being co-axially aligned along the rotation axis; and
      a clutch assembly operable in first and second final drive ratios, wherein when the clutch assembly is in the first final drive ratio, the clutch assembly grounds the sun gear to prevent the sun gear from rotating about the rotation axis such that torque from the outer ring gear drives the planetary gear set which causes the planetary carrier and the differential housing to rotate relative to the sun gear, and wherein when the clutch assembly is in the second final drive ratio, the clutch assembly locks the sun gear to the planetary carrier such that the sun gear is prevented from rotating relative to the planetary carrier and the differential housing such that torque from the outer ring gear causes the planetary gear set, the planetary carrier and the differential housing to rotate together as a unit about the rotation axis.

15. The multiple speed differential arrangement of claim 14, wherein the clutch assembly includes clutch packs that are configured to control relative rotation between the sun gear and planetary carrier.

16. The multiple speed differential arrangement of claim 14, wherein the clutch assembly includes clutch packs that are configured to control whether the sun gear rotates.

17. The multiple speed differential arrangement of claim 14, wherein the torque transfer arrangement includes pinion gears supported on respective pinion shafts that extend into and rotate with the differential housing.

* * * * *